US011424955B2

(12) United States Patent
White et al.

(10) Patent No.: US 11,424,955 B2
(45) Date of Patent: Aug. 23, 2022

(54) SYSTEM AND METHOD FOR QUALITATIVE ANALYSIS OF BASEBAND BUILDING AUTOMATION NETWORKS

(71) Applicant: Siemens Industry, Inc., Alpharetta, GA (US)

(72) Inventors: Joe White, Austin, TX (US); Juan Cabrera, Buda, TX (US)

(73) Assignee: Siemens Industry, Inc., Alpharetta, GA (US)

( * ) Notice: Subject to any disclaimer, the term of this patent is extended or adjusted under 35 U.S.C. 154(b) by 225 days.

(21) Appl. No.: 16/631,403

(22) PCT Filed: Aug. 24, 2017

(86) PCT No.: PCT/US2017/048427
§ 371 (c)(1),
(2) Date: Jan. 15, 2020

(87) PCT Pub. No.: WO2019/040069
PCT Pub. Date: Feb. 28, 2019

(65) Prior Publication Data
US 2020/0220744 A1   Jul. 9, 2020

(51) Int. Cl.
*H04L 12/40* (2006.01)
*G05B 19/418* (2006.01)
(Continued)

(52) U.S. Cl.
CPC ........ *H04L 12/40136* (2013.01); *F24F 11/56* (2018.01); *G05B 19/4185* (2013.01);
(Continued)

(58) Field of Classification Search
CPC ......... H04L 12/40136; H04L 12/40065; H04L 41/22; H04L 25/0202; H04L 12/2803;
(Continued)

(56) References Cited

U.S. PATENT DOCUMENTS 4,539,652 A * 9/1985 Rubin ..................... H04M 3/30
710/100
6,615,089 B1 * 9/2003 Russie ................. A61N 1/3712
700/21
(Continued)

FOREIGN PATENT DOCUMENTS

WO     2015102579 A1    7/2015

OTHER PUBLICATIONS

Jang W S et al: "Wireless sensor network performance metrics for building applications", Energy and Buildings, Lausanne, CH, vol. 42, No. 6, Jun. 1, 2010 (Jun. 1, 2010), pp. 862-868, XP026987093, 8 pages.
(Continued)

*Primary Examiner* — Hoang-Chuong Q Vu

(57) ABSTRACT

A system and method is provided for qualitative analysis of baseband building automation networks. The system may include a processor configured to carry out a plurality of tests on a serial communication network that includes at least one field device that carries out building automation communications on the network. A first test may include: transmitting a series of queries for devices on the network, in which the queries are transmitted at incrementally lower transmission signal levels until message loss is detected; and determining a first lower signal level at which transmissions of queries occur without message loss on the network. In addition, the processor may be configured to determine and output on a display device at least one classification of the relative quality of the network with respect to at least one predetermined scale of relative network quality based at least in part on the first lower signal level.

15 Claims, 5 Drawing Sheets

(51) Int. Cl.
*F24F 11/56* (2018.01)
*H04W 76/15* (2018.01)
*G06F 16/9035* (2019.01)

(52) U.S. Cl.
CPC .... *G06F 16/9035* (2019.01); *H04L 12/40065* (2013.01); *H04W 76/15* (2018.02)

(58) Field of Classification Search
CPC .. H04L 12/2816; F24F 11/56; G05B 19/4185; G06F 16/9035; H04W 76/15; H04W 52/36; H04W 52/50; H04B 17/0085; H04B 17/23; H04B 17/309
See application file for complete search history.

(56) References Cited

U.S. PATENT DOCUMENTS

| | | | | |
|---|---|---|---|---|
| 10,084,555 | B1* | 9/2018 | Olgaard | H04B 17/29 |
| 2003/0093513 | A1* | 5/2003 | Hicks | H04M 3/2254 |
| | | | | 709/224 |
| 2006/0253744 | A1* | 11/2006 | Mayes | H04L 43/50 |
| | | | | 714/43 |
| 2014/0349585 | A1* | 11/2014 | Aydin | H04W 24/06 |
| | | | | 455/67.14 |
| 2014/0369218 | A1* | 12/2014 | Ionta | H04L 43/026 |
| | | | | 370/252 |
| 2015/0295810 | A1* | 10/2015 | Wang | H04L 43/10 |
| | | | | 370/252 |
| 2016/0020973 | A1* | 1/2016 | Mishra | H04L 43/106 |
| | | | | 370/252 |
| 2017/0181194 | A1* | 6/2017 | Huang | H04W 72/04 |
| 2017/0339584 | A1* | 11/2017 | Ketonen | H04L 41/5019 |
| 2017/0351781 | A1* | 12/2017 | Alexander | G06F 16/3347 |
| 2018/0046919 | A1* | 2/2018 | Li | G10L 15/16 |

OTHER PUBLICATIONS

Michael R Brambley et al: "Advanced Sensors and Controls for Building Applications: Market Assessment and Potential R&D Pathways", Apr. 13, 2005 (Apr. 13, 2005), XP055322645, 162 pages.

Li Jing et al: "Therm0Net: fine-grain assessment of building comfort and efficiency", Journal of Ambient Intelligence and Humanized Com Pu Ti Ng, Springer Berlin Heidelberg, Berlin/Heidelberg, vol. 5, No. 3, Jul. 11, 2013 (Jul. 11, 2013), pp. 369-382, XP035318364, 14 pages.

PCT Search Report dated Apr. 30, 2018, for PCT Application No. PCT/US2017/048427, 16 pages.

\* cited by examiner

SYSTEM AND METHOD FOR QUALITATIVE ANALYSIS OF BASEBAND BUILDING AUTOMATION NETWORKS

RELATED APPLICATION

This patent document claims priority under 35 U.S.C. § 119 and all other benefits from PCT Application No. PCT/US2017/048427, titled "System and Method For Qualitative Analysis of Baseband Building Automation Networks" filed Aug. 24, 2017, the content of which is hereby incorporated by reference to the extent permitted by law.

TECHNICAL FIELD

The present disclosure is directed, in general, to building automation systems that are used to control devices in a building such as HVAC equipment, blind actuators, and lighting actuators.

BACKGROUND

Building automation systems provide communication with and control of devices in a building over various networks. Such systems may benefit from improvements.

SUMMARY

Variously disclosed embodiments include data processing systems and methods that may be used to facilitate qualitative analysis of baseband building automation networks. In one example, a system may comprise at least one processor configured via executable instructions included in at least one memory to carry out a plurality of tests on a serial communication network that includes at least one field device that carries out building automation communications on the serial communication network. The plurality of tests include a first test that includes: transmitting a series of queries for devices on the serial communication network, in which the queries are transmitted at incrementally lower transmission signal levels until message loss is detected; and determining a first lower signal level at which transmissions of queries occur without message loss on the serial communication network.

In addition, the at least one processor may be configured to determine at least one classification of the relative quality of the serial communication network with respect to at least one predetermined scale of relative network quality based at least in part on the first lower signal level. Further, the at least one processor may be configured to output on a display device the at least one classification.

In another example, a method for system and method for qualitative analysis of baseband building automation networks may comprise acts carried out through operation of at least one processor that correspond to the functions for which the previously described at least one processor is configured to carry out.

A further example may include a non-transitory computer readable medium encoded with executable instructions (such as a software/firmware component on a storage device) that when executed, causes at least one processor to carry out this described method.

Another example may include a product or apparatus including at least one hardware, software, and/or firmware based processor, computer, component, controller, means, module, and/or unit configured for carrying out functionality corresponding to this described method.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Also, before undertaking the Detailed Description below, it should be understood that various definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

DETAILED DESCRIPTION

Figure 1:
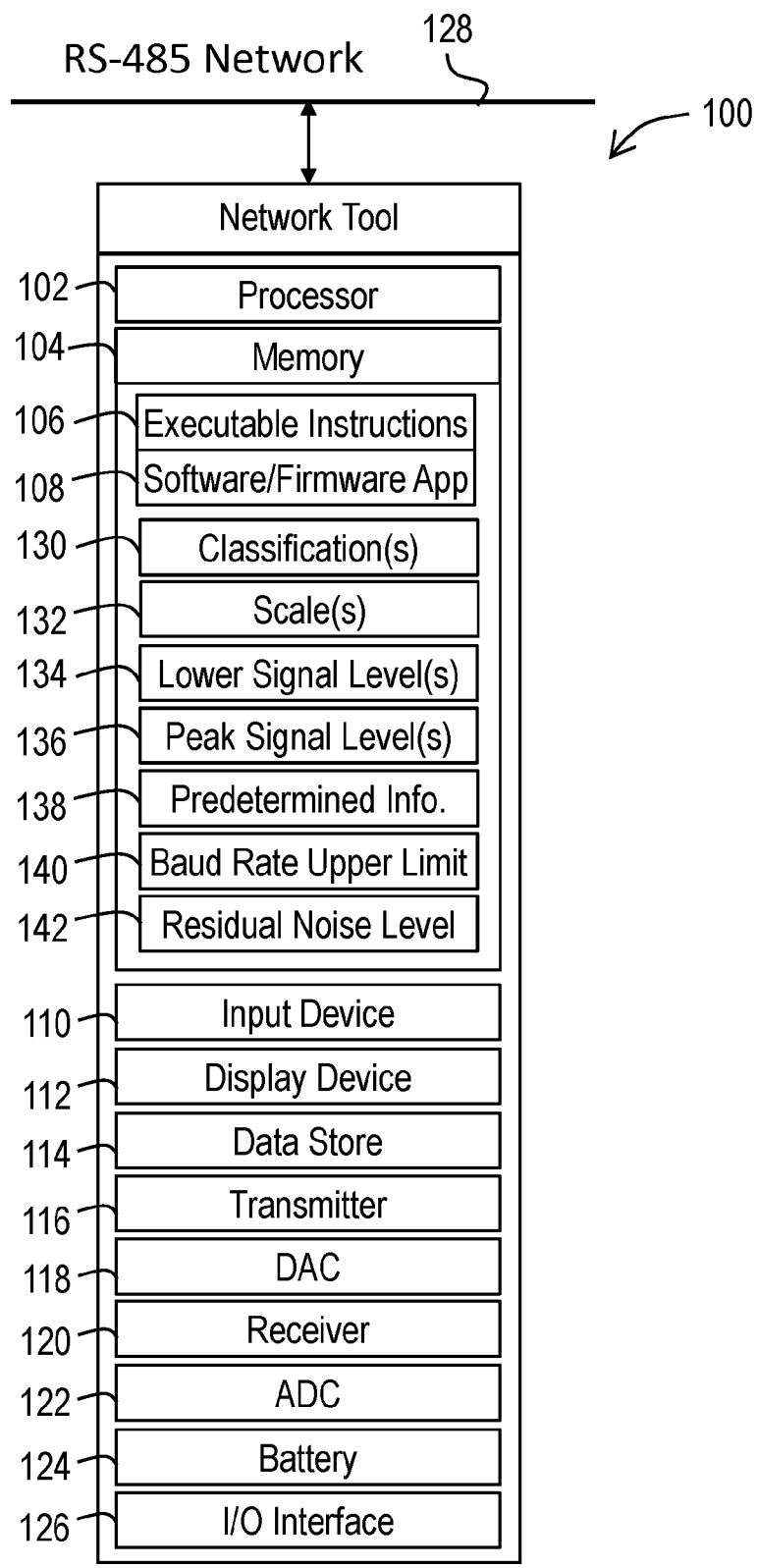
FIG. 1 illustrates a functional block diagram of an example network tool that facilitates qualitative analysis of baseband building automation networks.

Various technologies that pertain to systems and methods that facilitate qualitative analysis of baseband building automation networks will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Building automation systems and energy management systems rely on networked communications to field devices. A common type of network found in use by these systems is based on the EIA RS-485 signaling standard. An RS-485 network is a serial communication network that uses baseband signaling, (i.e., without a carrier signal). Signaling relies on changes in voltage level to correspond to a logic level or state. As a result, it is difficult to establish a margin for what is good communication versus what is bad. There is always the question as to how good is the network? Quality of the network wiring installation is always a question. Was the correct wire used and terminated correctly? Is the routing such that electrical noise can be present on the network?

The following describes an example embodiment of network tool that is capable of providing quantitative data regarding the quality of a baseband network, such as an RS-485 network or other serial communication network. However, it should be appreciated that the described tool may be adapted for use with other types of baseband signaling networks.

The example network tool may be configured to provide characterization of the network cabling and its routing such that repairs can be made or installation deficiencies can be corrected. In addition, field devices may fail in such a way that their commination performance is marginal. Swapping the device is generally carried out in order to troubleshoot the issue. An example embodiment of the network tool may enable determination of marginal devices such that a failing unit can be identified and replaced.

It should be appreciated that an RS-485 network in building automation applications may run various communications protocols such as BACnet and Modbus. The following description of the network tool is directed specifically with respect to Modbus RS-485 networks. However, it should be appreciated that the described tool may be configured for use with other types of communication protocols/networks as well.

FIG. 1 illustrates an example of a network tool 100. The network tool 100 may correspond to a portable (e.g., handheld) data processing system or a combination of such a handheld device and another data processing system such as a PC, mobile phone, and/or tablet. The network tool 100 may include at least one processor 102 (e.g., a microprocessor/CPU) that is configured to carry out various processes and functions described herein by executing from a memory 104, executable instructions 106 (such as software/firmware instructions). Such executable instructions 106 may correspond to one or more software/firmware applications 108 or portions thereof that are programmed to cause the at least one processor to carry out the various processes and functions described herein.

Such a memory 104 may correspond to an internal or external volatile memory (e.g., main memory, CPU cache, and/or RAM), that is included in the processor and/or in operative connection with the processor. Such a memory 104 may also correspond to a nonvolatile memory (e.g., flash memory, EPROM, SSD, or other storage device or non-transitory computer readable media) in operative connection with the processor.

The described network tool 100 may include at least one input device 110 and at least one display device 112 in operative connection with the processor. The input device, for example, may include a mouse, keyboard, touch screen, or other type of input device capable of providing user inputs to the processor. The display device, for example, may include an LCD or AMOLED display screen, monitor, or any other type of display device capable of displaying outputs from the processor.

The network tool 100 may also include one or more data stores 114. The processor 102 may be configured to manage, retrieve, generate, use, revise, and store data and/or other information described herein from/in the data store 114. Examples of a data store may include a file and/or a record stored in a database, file system, flash drive, SSD, memory card and/or any other type of device or system that stores non-volatile data.

In example embodiments the network tool may also include an RS-485 transmitter 116 with a digital-to-analog converter (DAC) 118, which controls the output signal level of the transmitter to a connected RS-485 network 128. The network tool may also include an RS-485 receiver 120 for reception of data packets from an RS-485 network and a high speed analog-to-digital converter (ADC) 122 for analog capture of the received packets.

To enable portability, the network tool 100 may include a battery pack 124 for electrical power. In addition, the network tool may include at least one input/output interface 126 (serial, USB, Bluetooth) to enable export of data acquired by the network tool to a PC, tablet, mobile phone, server, or other data processing system.

Figure 2:
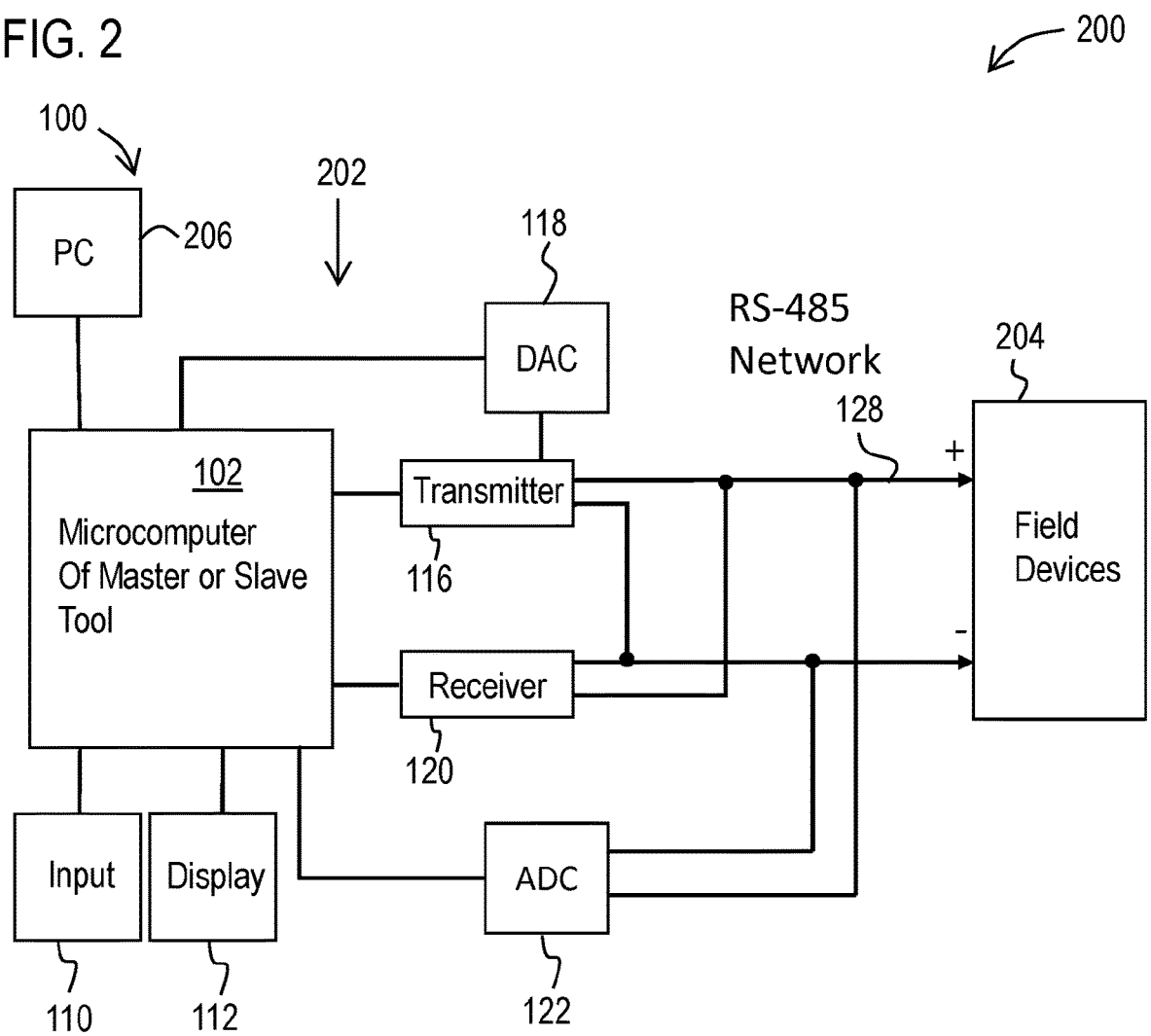
FIG. 2 illustrates an example schematic of a system in which the network tool is connected to an RS-485 network.

FIG. 2 illustrates an example schematic of a system 200 in which the network tool 100 includes a handheld portable device 202 that is connected to a baseband network 128. Such a network, for example, may correspond to an RS-485 network to which a plurality of field devices 204 (e.g., controllers for heating, ventilation and air conditioning—HVAC equipment) are connected. FIG. 2 also illustrates that the network tool may optionally include a PC 206 or other data processing system connected to the portable device 202 in order to retrieve and analyze the data acquired by the portable device.

In example embodiments, the portable device 202 of the network tool 100 may be configured to carry out either master or slave emulation. For example, the portable device may provide the user with a selection on the display device 112 to toggle the operation of the portable device between a master emulation mode and a slave emulation mode. As illustrated in the example 300 shown in FIG. 3, in further embodiments, the described network tool 100 may correspond to two of the portable devices, with one configured to be in the master emulation mode (as a master tool 302) and the second to be configured in the slave emulation mode (as a slave tool 304).

The example network tool 100 may be configured to carry out a plurality of tests in the master and slave emulation modes. In a first example test, the master tool 302 (i.e., the portable device in the master emulation mode), may be configured to query field device(s) 306, 308 on the network 128 to establish a baseline. For example, the network tool may be configured to initially query for devices with queries (i.e., messages transmitted on the network) at an initial transmission signal level (e.g., voltage level) and incrementally (e.g., gradually) reduce the signal level of the transmissions until the network tool detects message loss (e.g., via a failure to receive responses 312).

Referring back to FIG. 1, the lower signal level 134, at or just before message loss is detected, may be determined and stored in memory 104 (volatile and/or nonvolatile) as a first lower signal level 134 (i.e., a lower limit) for the network being tested. The at least one processor 102 of the network tool may be configured to determine at least one classification 130 of the relative quality of the RS-485 network with respect to at least one predetermined scale 132 of relative network quality based at least in part on the first lower signal level 134.

For example, the scale 132 for lower signal levels may specify different classification levels for different ranges of the lower signal levels based on an empirically determined standard for known good and bad networks. For example, such a scale for lower level signal levels may be determined from averages of previous tests on known good and bad RS-485 networks.

The determined first lower signal level limit may be compared to the ranges specified by the scale to evaluate and classify how good the currently tested network behaves. The determined classification of this first test (and/or further tests described below) may be outputted on the display device 112.

Figure 3:
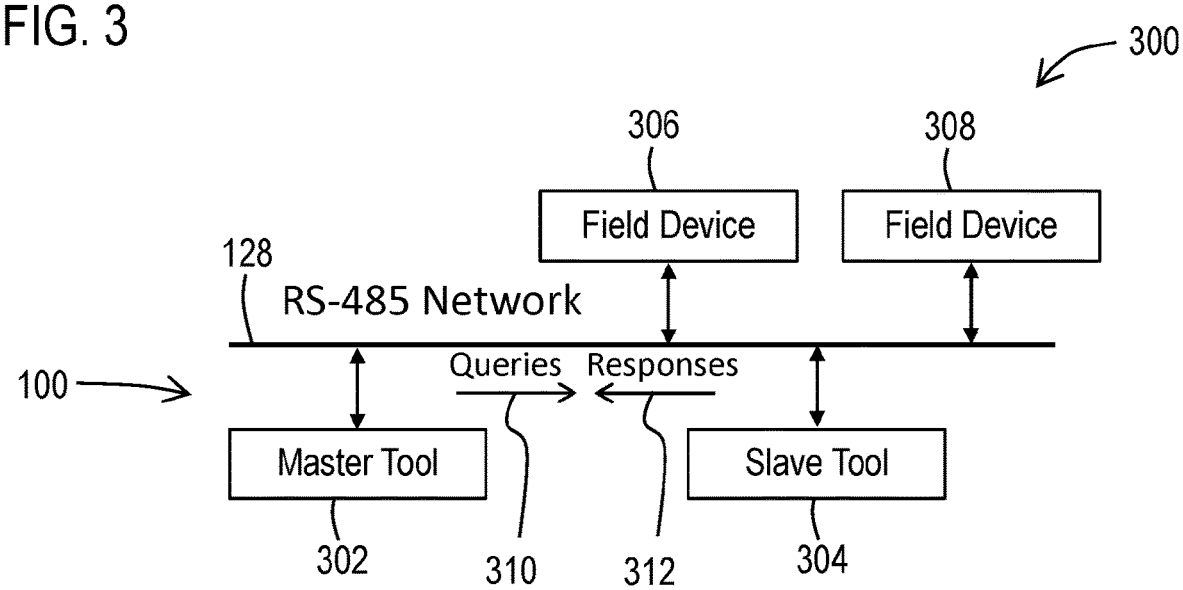
FIG. 3 illustrates a functional block diagram of an example network tool in the form of a master tool and a slave tool that are used individually or in combination to carry out a plurality of tests on the RS-485 network.

Referring to FIG. 3, in a second example test, the master tool 302 may be configured to query field device(s) 306, 308 on the network 128 to capture the data packets for the response 312 as analog data. As illustrated in FIG. 1, the master tool may then process the analog data and determine a first peak signal level 136.

Also, similar to the first test, the at least one processor 102 of the network tool may be configured to determine at least one classification 130 of the relative quality of the RS-485 network with respect to at least one predetermined scale 132 of relative network quality based at least in part on the first peak signal level 136. Such a scale may specify different classification levels for different ranges of peak signal levels based on an empirically determined standard for known good and bad networks. The determined classification of this second test may be outputted on the display device 112 as an additional classification and/or as part of a composite classification based on other test performed on the network.

Referring to FIG. 3, a third example test may be carried out to determine a baud rate upper limit based on analyzing communications received by the master tool from the slave tool. In a first approach, the master tool 302 may transmit a series of queries 310 for devices on the RS-485 network 128, in which the queries are transmitted at incrementally faster baud rates. The slave tool 304 may be configured to respond to such queries 310 by the master tool 302 with communications that can be analyzed and/or validated by the master tool.

Referring to FIG. 1, such communications may include predetermined information 138 known to both the slave and master tools, via being stored therein or being calculated in a repeatable manner. The master tool may be configured to incrementally (e.g., gradually) increase the baud rate of these queries. The information received from the slave tool may then be validated (by comparing it to expected predetermined information known to the master tool) in order to establish a baud rate upper limit 140 for the network. This baud rate upper limit 140 may be based on the baud rate at or just before the occurrence of responses to the queries that fail validation (i.e., that do not match the expected predetermined information due to communication issues at the present baud rate).

In addition or alternatively, this described third test regarding upper baud rates may include an approach that involves signal frequency spectrum analysis. For example, the master tool 302 may send a command to the slave tool 304 that causes the slave tool to return a communication in the form of a pulse train of a specific frequency on the network 128. The master tool may capture the communication via its high speed ADC 122. The master tool may then perform spectrum analysis on the captured signals (e.g., via Fourier transform) in order to determine the quality of the network (e.g., its capability to reliably communicate information) at this specific frequency. The master tool may also be configured to send a series of such commands to the slave tool for transmitting pulse trains at different frequencies, in order to analyze the quality of the network across a wide range of frequencies. Such analysis may, for example, be used to determine the baud rate upper limit 140 (e.g., corresponding to a maximum pulse train frequency), at which information can be reliably communicated on the network without errors.

Also, similar to the first and second tests, the at least one processor 102 of the network tool may be configured to determine at least one classification 130 of the relative quality of the RS-485 network with respect to at least one predetermined scale 132 of relative network quality based at least in part on the baud rate upper limit 140. Such a scale may specify different classification levels for different ranges of baud rate upper limits based on an empirically determined standard for known good and bad networks. The determined classification of this third test may be outputted on the display device 112 as an additional classification and/or as part of a composite classification based on other tests performed on the network.

In a fourth example test, the slave tool 304 (in the slave emulation mode) may be configured to determine the peak signal level received in a manner similar to the second example test describe previously. In this example, the slave tool may be configured to capture data packets as analog data that are transmitted from the master tool 302 and/or field devices 306, 308 on the network 128. The slave portable handheld device may then process the analog transmission 310, 312 and determine a second peak signal level 136.

Also, similar to the second test, the at least one processor 102 of the network tool may be configured to determine at least one classification 130 of the relative quality of the RS-485 network with respect to at least one predetermined scale 132 of relative network quality based at least in part on the second peak signal level 136. As discussed previously, such a scale may specify different classification levels for different ranges of peak signal levels based on an empirically determined standard for known good and bad networks. The determined classification of this fourth test may be outputted on the display device 112 as an additional classification and/or as part of a composite classification based on other tests performed on the network.

In a fifth example test, the slave tool 304 may be configured to incrementally (e.g., gradually) reduce response signal level until the network tool detects message loss similar to the first example test described previously. Detection of retries indicates errors are occurring. For example, the slave tool 304 may be configured to initially respond to queries (from a master tool and/or other devices on the network) with a relatively high initial transmission signal (e.g., voltage level) and incrementally reduce the signal level of the response signals until the slave and/or master tool detects message loss. The at least one processor 102 of the network tool may be configured to determine a second lower signal level 134 at which responses from the slave tool 304 are received by the master tool without message loss on the network.

Also, similar to the first test, the at least one processor 102 of the network tool may be configured to determine at least one classification 130 of the relative quality of the RS-485 network with respect to at least one predetermined scale 132 of relative network quality based at least in part on the second lower signal level 134. As discussed previously, such a scale may specify different classification levels for different ranges of lower signal levels based on an empirically determined standard for known good and bad networks. The determined classification of this fifth test may be outputted on the display device 112 as an additional classification and/or as part of a composite classification based on other tests performed on the network.

In a sixth example test, the network tool (with either the slave or master tool) may listen to the network when inactive (and not transmitting building automation communications) using the ADC 122 to determine what sort of DC level or residual noise level may be present on the network. As with the previously described tests, the at least one processor 102 of the network tool may be configured to determine at least one classification 130 of the relative quality of the RS-485 network with respect to at least one predetermined scale 132 of relative network quality based at least in part on the residual noise level 142. As discussed previously, such a scale may specify different classification levels for different ranges of residual noise levels based on an empirically determined standard for known good and bad networks. The determined classification of this sixth test may be outputted on the display device 112 as an additional classification and/or as part of a composite classification based on other tests performed on the network.

In example embodiments, the described predetermined scales may delineate between different classifications of network quality such as good, average, poor (or other ratings) based on designated ranges for which the quantitative test results fall into. Such scales may designate different levels of quality via: different words (e.g., high, good, average, poor); grades (P-Pass, F-Fail); percentages (above 60%; 40-60%; under 40%, where higher % is higher quality); colors (e.g., green for acceptable quality, red for poor quality); numeric ranges/scores (e.g., 1-5, where higher values are higher quality), or any other type of predetermine scale that can represent different classifications of network quality.

The different ranges on a predetermined scale that represent different classifications of quality may be determined based on empirical testing using the described network tool on good networks, poor networks, exceptional networks, average networks, and/or other set of networks with a definable quality. As discussed previously, individual scales may be used to classify quality results for one or more of the individual tests, and/or different aspects of the network (e.g., wiring, field devices). Also, an overall scale may be used to classify the overall quality of the network based on a composite of some or all of qualitative results and/or classifications from the different tests carried out on the network.

In example, embodiments, the internal microcomputer 102 on the network tools 100 and/or a secondary data processing system 206 may output through a display device 112, indicia (e.g., text, numbers, colors) corresponding to such determined classifications for an overall quality of the network and/or individual classifications for individual test and/or aspects of the network (e.g., wiring, field devices). In further example embodiments, the internal microcomputer 102 or other data processing system 206 may be configured to carry out other evaluations on signals captured from the network. Such evaluations may include carrying out digital signal processing on the analog captured signals from the network to capture and quantify signal distortion percentage, harmonics, residual noise, DC bias, or any other information that quantifies communication characteristics of the network. Such additional evaluations may also be used to classify the quality of the network relative to corresponding predetermined ranges for known good and bad networks In tests where two portable devices (i.e., slave and master tools) are used, the network tool 100 may be configured to carry out the network classification that includes a quantification of the quality of the wiring and installation. In cases where actual network field devices are used as part of the test, the network tools may be configured to classify the performance of the field devices.

Figure 4:
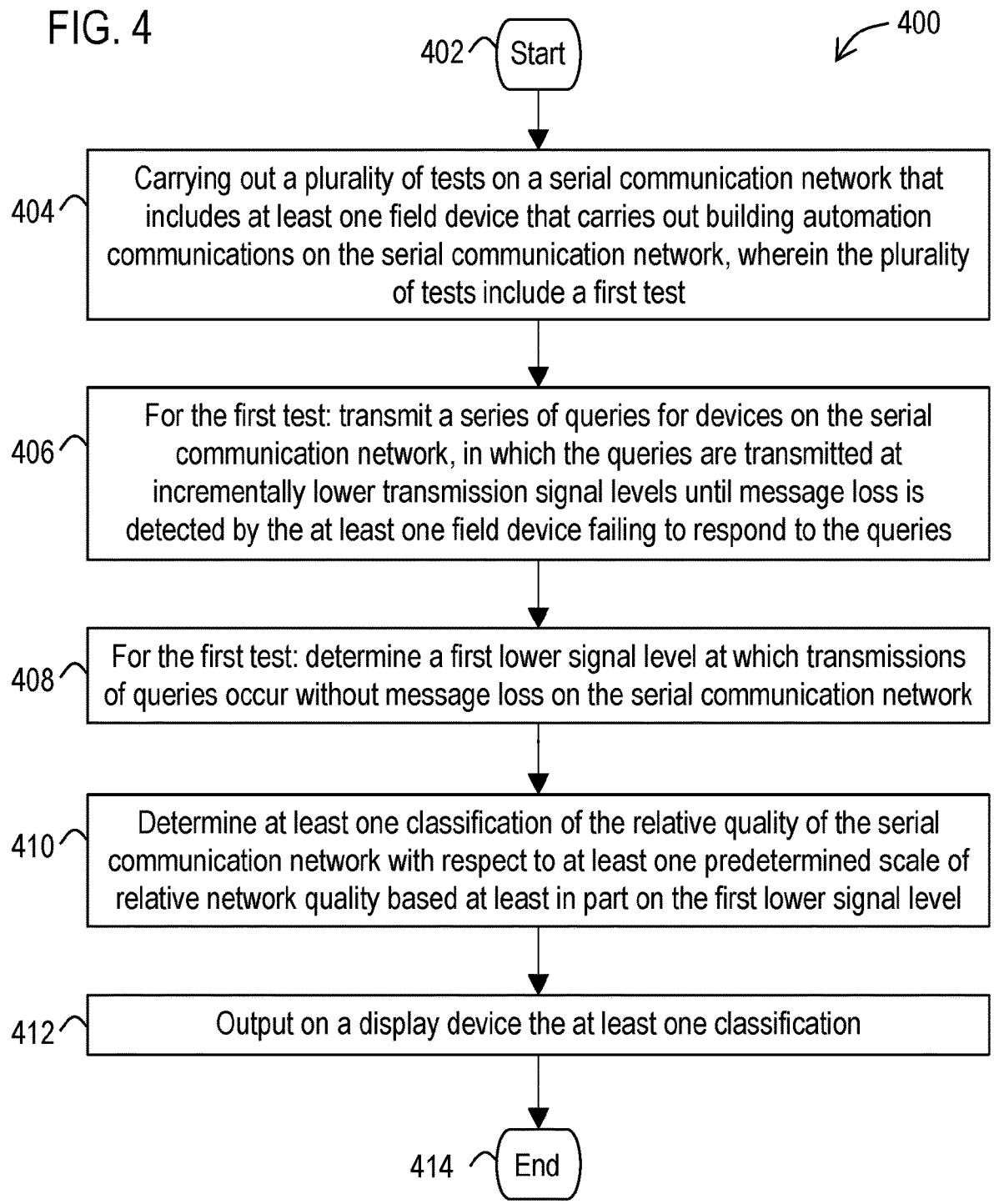
FIG. 4 illustrates a flow diagram of an example methodology that facilitates qualitative analysis of baseband building automation networks.

Referring now to FIG. 4, a methodology 400 is illustrated that facilitates qualitative analysis of baseband building automation networks. While the methodology is described as being a series of acts that are performed in a sequence, it is to be understood that the methodology may not be limited by the order of the sequence. For instance, unless stated otherwise, some acts may occur in a different order than what is described herein. In addition, in some cases, an act may occur concurrently with another act. Furthermore, in some instances, not all acts may be required to implement a methodology described herein.

The methodology may start at 402 and may include several acts carried out through operation of at least one processor. These acts may include an act 404 of carrying out a plurality of tests on a serial communication network (e.g., an RS-485 network) that includes at least one field device that carries out building automation communications on the serial communication network. The plurality of tests may include a first test. The first test may include an act 406 of transmitting a series of queries for devices on the serial communication network, in which the queries are transmitted at incrementally lower transmission signal levels until message loss is detected by the at least one field device failing to respond to the queries. The first test may also include an act 408 of determining a first lower signal level at which transmissions of queries occur without message loss on the serial communication network. In addition, the methodology 400 may include an act 410 of determining at least one classification of the relative quality of the serial communication network with respect to at least one predetermined scale of relative network quality based at least in part on the first lower signal level. Also, the methodology 400 may include an act 412 of outputting on a display device the at least one classification. At 414 the methodology may end.

Also, it should be appreciated that this described methodology may include additional acts and/or alternative acts corresponding to the features described previously with respect to the data processing system 100.

For example, the plurality of tests may include a second test that includes acts of: receiving at least one response from a field device on the serial communication network responding to at least one query that was transmitted on the serial communication network; and determining a first peak signal level of the at least one response. In this example the act 410 of determining the at least one classification of the relative quality of the serial communication network may be carried out with respect to the at least one predetermined scale of relative network quality further or alternatively based at least in part on the first peak signal level.

In addition, the plurality of tests may include a third test involving use of the network tool in the form of a master tool and a slave tool. This third test may include an act of determining a baud rate upper limit based on analyzing communications received by the master tool from the slave tool.

In a first approach, this third test may include the master tool transmitting a series of queries for devices on the serial communication network, in which the queries are transmitted at different baud rates. The slave tool may then transmit at least one response to each query from the master tool on the serial communication network, which responses include predetermined information. The master tool may: receive the at least one response to each query from the slave tool on the serial communication network; and validate whether the predetermined information in the at least one response to each query matches expected predetermined information in order to determine the baud rate upper limit corresponding to a maximum baud rate that returns matching predetermined information.

In a second approach, this third test may include the master tool transmitting a series of commands to the slave device on the serial communication network, in which the commands specify respective different frequencies for transmitting respective pulse trains. The slave tool may then transmit pulse trains on the serial communication network in response to each command at the specified frequency. The master tool may analyze each pulse train to determine the baud rate upper limit corresponding to a maximum pulse train frequency at which the pulse trains reliably communicate information.

It should be appreciated that either or both of these approaches may be carried out to determine the baud rate upper limit. In addition, in this example the act 410 of determining the at least one classification of the relative quality of the serial communication network may be carried out with respect to the at least one predetermined scale of relative network quality further based at least in part on the baud rate upper limit.

In further embodiments, the plurality of tests may include a fourth test that includes acts of: receiving with the slave tool, at least one transmission on the serial communication network from at least one of the master tool, at least one field device, or any combination thereof; and determining a second peak signal level of the at least one transmission. In this example the act 410 of determining the at least one classification of the relative quality of the serial communication network may be carried out with respect to the at least one predetermined scale of relative network quality further or alternatively based at least in part on the second peak signal level.

In the example methodology 400, the plurality of tests may include a fifth test that includes acts of: the slave tool transmitting responses to queries for devices on the serial communication network, in which the responses are transmitted at incrementally lower transmission signal levels until message loss is detected; and determining a second lower signal level at which responses from the slave are received by the master tool without message loss on the serial communication network. In this example the act 410 of determining the at least one classification of the relative quality of the serial communication network may be carried out with respect to the at least one predetermined scale of relative network quality further or alternatively based at least in part on the second lower signal level.

Also, in example embodiments, the plurality of tests may include a sixth test that includes acts of: listening to the network when inactive and not transmitting building automation communications in order to determine a residual noise level on the serial communication network. Here, the act 410 of determining the at least one classification of the relative quality of the serial communication network may be carried out with respect to the at least one predetermined scale of relative network quality further or alternatively based at least in part on the residual noise level.

In these describes examples of the methodology 400, the plurality of field devices may include HVAC field devices and the building automation communications may include BACnet and Modbus for example. Also, the serial communication network may include an RS-485 network. However, it should be appreciated that in alternative embodiments, the described network tool may be configured for use with other types of baseband networks, communication protocols, and network devices. It should also be appreciated that alternative embodiments, may include or omit one or more of the described tests and may include one or more additional tests.

As discussed previously, acts associated with the above-described methodologies (other than any described manual acts) may be carried out by one or more processors 102. Such processor(s) may be included in one or more data processing system (such as the network tool 100 and/or other systems), for example, that execute from at least one memory 104 executable instructions 106 (such as software instructions) that are operative to cause these acts to be carried out by the one or more processors.

Also, as used herein a processor corresponds to any electronic device that is configured via hardware circuits, software, and/or firmware to process data. For example, processors described herein may correspond to one or more (or a combination) of a microprocessor, CPU, or any other integrated circuit (IC) or other type of circuit that is capable of processing data in a data processing system. It should be understood that a processor that is described or claimed as being configured to carry out a particular described/claimed process or function may: correspond to a CPU that executes computer/processor executable instructions stored in a memory in the form of software and/or firmware to carry out such a described/claimed process or function; and/or may correspond to an IC that is hard wired with processing circuitry (e.g., an FPGA or ASIC IC) to carry out such a described/claimed process or function.

It should also be understood that a processor that is described or claimed as being configured to carry out a particular described/claimed process or function may correspond to the combination of the processor 102 with the software instructions 106 loaded/installed into the described memory 104 (volatile and/or non-volatile), which are currently being executed and/or are available to be executed by the processor to cause the processor to carry out the described/claimed process or function. Thus, a processor that is powered off or is executing other software, but has the described software instructions installed on a storage device in operative connection therewith (such as a hard drive or SSD) in a manner that is setup to be executed by the processor (when started by a user, hardware and/or other software), may also correspond to the described/claimed processor that is configured to carry out the particular processes and functions described/claimed herein.

Further the phrase "at least one" before an element (e.g., a processor) that is configured to carry out more than one function/process may correspond to one or more elements (e.g., processors) that each carry out the functions/processes and may also correspond to two or more of the elements (e.g., processors) that respectively carry out different ones of the one or more different functions/processes.

It is important to note that while the disclosure includes a description in the context of a fully functional system and/or a series of acts, those skilled in the art will appreciate that at least portions of the mechanism of the present disclosure and/or described acts are capable of being distributed in the form of computer/processor executable instructions (e.g., the described software instructions and/or corresponding firmware instructions) contained within a non-transitory machine-usable, computer-usable, or computer-readable medium in any of a variety of forms, and that the present disclosure applies equally regardless of the particular type of instruction or data bearing medium or storage medium utilized to actually carry out the distribution. Examples of non-transitory machine usable/readable or computer usable/readable mediums include: ROMs, EPROMs, magnetic tape, hard disk drives, SSDs, flash memory, CDs, DVDs, and Blu-ray disks. The computer/processor executable instructions may include a routine, a sub-routine, programs, applications, modules, libraries, and/or the like. Further, it should be appreciated that computer/processor executable instructions may correspond to and/or may be generated from source code, byte code, runtime code, machine code, assembly language, Java, JavaScript, Python, C, C#, C++ or any other form of code that can be programmed/configured to cause at least one processor to carry out the acts and features described herein. Still further, results of the described/claimed processes or functions may be stored in a computer-readable medium, displayed on a display device, and/or the like.

Figure 5:
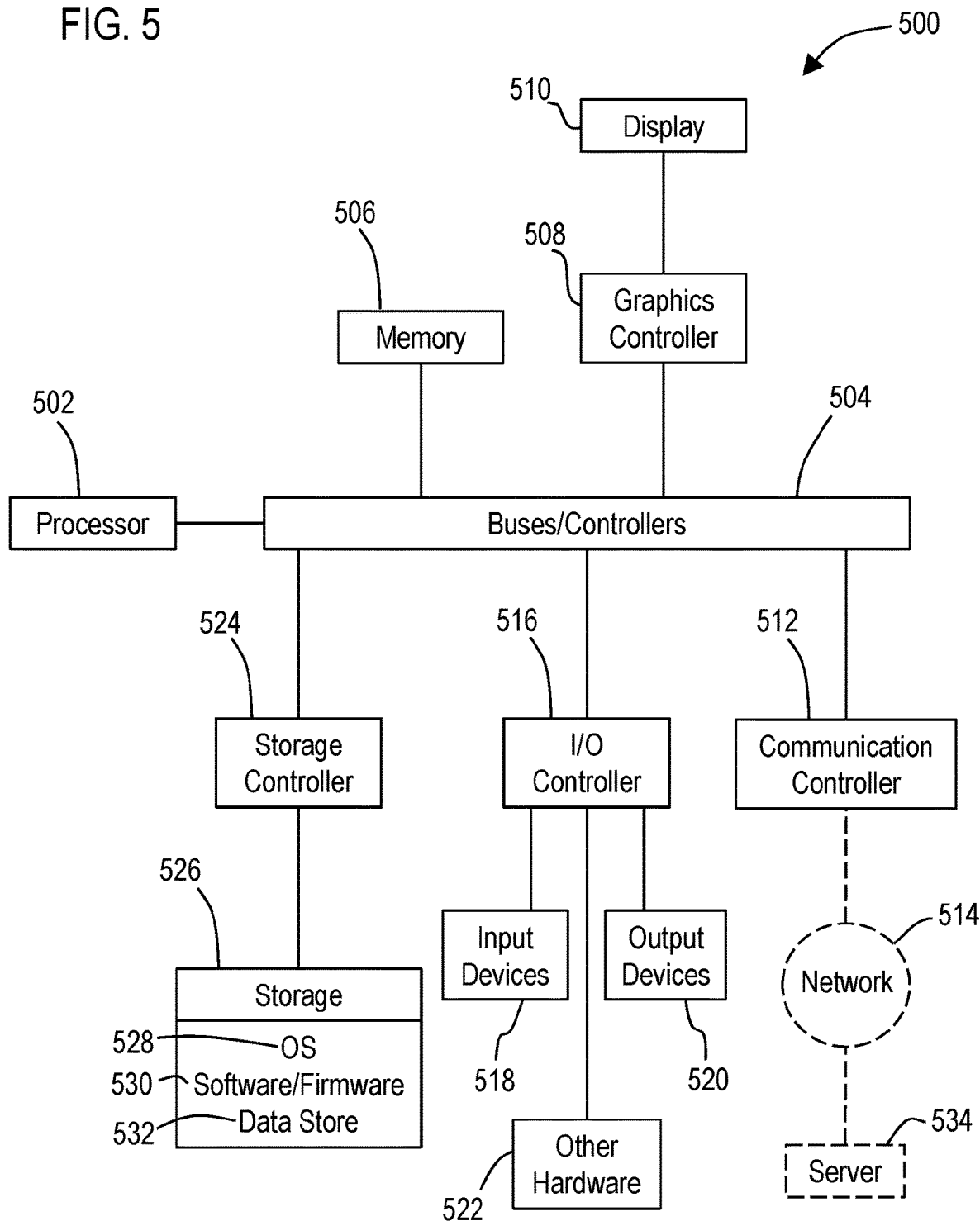
FIG. 5 illustrates a block diagram of a data processing system in which an embodiment may be implemented.

FIG. 5 illustrates a block diagram of a data processing system 500 (e.g., a computer system) in which an embodiment can be implemented, such as the previously described network tool 100, and/or other system operatively configured by computer/processor executable instructions, circuits, or otherwise to perform the functions and processes as described herein. The data processing system depicted includes at least one processor 502 (e.g., a CPU) that may be connected to one or more bridges/controllers/buses 504 (e.g., a north bridge, a south bridge). One of the buses 504, for example, may include one or more I/O buses such as a PCI Express bus. Also connected to various buses in the depicted example may include a main memory 506 (RAM) and a graphics controller 508. The graphics controller 508 may be connected to one or more display devices 510 (e.g., LCD or AMOLED display screen, monitor, VR headset, and/or projector). It should also be noted that the processor 502 may include a CPU cache memory. Further, in some embodiments one or more controllers (e.g., graphics, south bridge) may be integrated with the CPU (on the same chip or die). Examples of CPU architectures include IA-32, x86-64, and ARM processor architectures.

Other peripherals connected to one or more buses may include communication controllers 512 (Ethernet controllers, WiFi controllers, cellular controllers) operative to connect to a local area network (LAN), Wide Area Network (WAN), a cellular network, and/or other wired or wireless networks 514 or communication equipment.

Further components connected to various busses may include one or more I/O controllers 516 such as USB controllers, Bluetooth controllers, and/or dedicated audio controllers (connected to speakers and/or microphones). It should also be appreciated that various peripherals may be connected to the I/O controller(s) (via various ports and connections) including input devices 518 (e.g., keyboard, mouse, pointer, touch screen, touch pad, drawing tablet, trackball, buttons, keypad, game controller, gamepad, camera, microphone, scanners, motion sensing devices that capture motion gestures), output devices 520 (e.g., printers, speakers) or any other type of device that is operative to provide inputs to or receive outputs from the data processing system.

Also, it should be appreciated that many devices referred to as input devices or output devices may both provide inputs and receive outputs of communications with the data processing system. For example, the processor 502 may be integrated into a housing (such as a tablet) that includes a touch screen that serves as both an input and display device. Further, it should be appreciated that some input devices (such as a laptop) may include a plurality of different types of input devices (e.g., touch screen, touch pad, and keyboard). Also, it should be appreciated that other peripheral hardware 522 connected to the I/O controllers 516 may include any type of device, machine, or component that is configured to communicate with a data processing system.

Additional components connected to various busses may include one or more storage controllers 524 (e.g., SATA). A storage controller may be connected to a storage device 526 such as one or more storage drives and/or any associated removable media, which can be any suitable non-transitory machine usable or machine readable storage medium. Examples, include nonvolatile devices, volatile devices, read only devices, writable devices, ROMs, EPROMs, magnetic tape storage, hard disk drives, solid-state drives (SSDs), flash memory, optical disk drives (CDs, DVDs, Blu-ray), and other known optical, electrical, or magnetic storage devices drives and/or computer media. Also in some examples, a storage device such as an SSD may be connected directly to an I/O bus 504 such as a PCI Express bus.

A data processing system in accordance with an embodiment of the present disclosure may include an operating system 528, software/firmware 530, and data stores 532 (that may be stored on a storage device 526 and/or the memory 506). Such an operating system may employ a command line interface (CLI) shell and/or a graphical user interface (GUI) shell. The GUI shell permits multiple display windows to be presented in the graphical user interface simultaneously, with each display window providing an interface to a different application or to a different instance of the same application. A cursor or pointer in the graphical user interface may be manipulated by a user through a pointing device such as a mouse or touch screen. The position of the cursor/pointer may be changed and/or an event, such as clicking a mouse button or touching a touch screen, may be generated to actuate a desired response. Examples of operating systems that may be used in a data processing system may include Microsoft Windows, Linux, UNIX, iOS, and Android operating systems. Also, examples of data stores include data files, data tables, relational database (e.g., Oracle, Microsoft SQL Server), database servers, or any other structure and/or device that is capable of storing data, which is retrievable by a processor.

The communication controllers 512 may be connected to the network 514 (which may or may not be a part of a data processing system 500), which can be any local, wide area, remote, private, and/or public data processing system network or combination of networks, as known to those of skill in the art, including the Internet. Data processing system 500 can communicate over the network 514 with one or more other data processing systems such as a server 534 (which may in combination correspond to a larger data processing system). For example, a larger data processing system may correspond to a plurality of smaller data processing systems implemented as part of a distributed system in which processors associated with several smaller data processing systems may be in communication by way of one or more network connections and may collectively perform tasks described as being performed by a single larger data processing system. Thus, it is to be understood that when referring to a data processing system, such a system may be implemented across several data processing systems organized in a distributed system in communication with each other via a network.

It should also be understood that the term "controller" means any device, system or part thereof that controls at least one operation, whether such a device is implemented in hardware, firmware, software or any combination thereof. It should be noted that the functionality associated with any particular controller may be centralized or distributed, whether locally or remotely. The described processor and memory may be included in a controller. Further, a controller may correspond to the described data processing system or any other hardware circuit that is operative to control at least one operation.

In addition, it should be appreciated that data processing systems may include virtual machines in a virtual machine architecture or cloud environment. For example, the processor 502 and associated components may correspond to the combination of one or more virtual machine processors of a virtual machine operating in one or more physical processors of a physical data processing system. Examples of virtual machine architectures include VMware ESCi, Microsoft Hyper-V, Xen, and KVM.

Also, it should be noted that the processor described herein may correspond to a remote processor located in a data processing system such as a server that is remote from the display and input devices described herein. In such an example, the described display device and input device may be included in a client data processing system (which may have its own processor) that communicates with the server (which includes the remote processor) through a wired or wireless network (which may include the Internet). In some embodiments, such a client data processing system, for example, may execute a remote desktop application or may correspond to a portal device that carries out a remote desktop protocol with the server in order to send inputs from an input device to the server and receive visual information from the server to display through a display device. Examples of such remote desktop protocols include Teradici's PCoIP, Microsoft's RDP, and the RFB protocol. In another example, such a client data processing system may execute a web browser or thin client application. Inputs from the user may be transmitted from the web browser or thin client application to be evaluated on the server, rendered by the server, and an image (or series of images) sent back to the client data processing system to be displayed by the web browser or thin client application. Also in some examples, the remote processor described herein may correspond to a combination of a virtual processor of a virtual machine executing in a physical processor of the server.

Those of ordinary skill in the art will appreciate that the hardware depicted for the data processing system may vary for particular implementations. For example, the data processing system 500 in this example may correspond to a controller, computer, workstation, server, PC, notebook computer, tablet, mobile phone, and/or any other type of apparatus/system that is operative to process data and carry out functionality and features described herein associated with the operation of a data processing system, computer, processor, software components, and/or a controller discussed herein. The depicted example is provided for the purpose of explanation only and is not meant to imply architectural limitations with respect to the present disclosure.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of the data processing system 500 may conform to any of the various current implementations and practices known in the art.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

Also, it should be understood that the words or phrases used herein should be construed broadly, unless expressly limited in some examples. For example, the terms "include" and "comprise," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Also, although the terms "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

In addition, the term "adjacent to" may mean: that an element is relatively near to but not in contact with a further element; or that the element is in contact with the further portion, unless the context clearly indicates otherwise. Further, the phrase "based on" is intended to mean "based, at least in part, on" unless explicitly stated otherwise.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. A system for qualitative analysis of baseband building automation networks comprising:
   at least one processor configured via executable instructions included in at least one memory to:
   carry out a plurality of tests on a serial communication network that includes at least one field device that carries out building automation communications on the serial communication network, wherein the plurality of tests include a first test that includes:

transmitting a series of queries for devices on the serial communication network, in which the queries are transmitted at incrementally lower transmission signal levels until message loss is detected; and determining a first lower signal level at which transmissions of queries occur without message loss on the serial communication network;

determine at least one classification of a relative quality of the serial communication network with respect to at least one predetermined scale of relative network quality based at least in part on the first lower signal level; and output on a display device the at least one classification.

2. The system according to claim 1, wherein the plurality of tests include a second test that includes:

receiving at least one response from a field device on the serial communication network responding to at least one query that was transmitted on the serial communication network; and determining a first peak signal level of the at least one response;

wherein determining the at least one classification of the relative quality of the serial communication network is carried out with respect to the at least one predetermined scale of relative network quality further based at least in part on the first peak signal level.

3. The system according to claim 1, wherein the system corresponds to a network tool that includes a master tool and a slave tool, wherein the plurality of tests include a third test that includes:

determining a baud rate upper limit based on analyzing communications received by the master tool from the slave tool by carrying out:

a first approach in which:
the master tool transmits a series of queries for devices on the serial communication network, in which the queries are transmitted at different baud rates;
the slave tool transmits at least one response to each query from the master tool on the serial communication network, which responses include predetermined information;
the master tool receives the at least one response to each query from the slave tool on the serial communication network; and
the master tool validates whether the predetermined information in the at least one response to each query matches expected predetermined information in order to determine the baud rate upper limit corresponding to a maximum baud rate that returns matching predetermined information;

a second approach in which:
the master tool transmits a series of commands to the slave device on the serial communication network, in which the commands specify respective different frequencies for transmitting respective pulse trains;
the slave tool transmits pulse trains on the serial communication network in response to each command at the specified frequency; and
the master tool analyzes each pulse train to determine the baud rate upper limit corresponding to a maximum pulse train frequency at which the pulse trains reliably communicate information;

or a combination thereof;

wherein determining the at least one classification of the relative quality of the serial communication network is carried out with respect to the at least one predetermined scale of relative network quality further based at least in part on the baud rate upper limit.

4. The system according to claim 3, wherein the plurality of tests include a fourth test that includes:

receiving with the slave tool, at least one transmission on the serial communication network from at least one of the master tool, at least one field device, or any combination thereof; and determining a second peak signal level of the at least one transmission;

wherein determining the at least one classification of the relative quality of the serial communication network is carried out with respect to the at least one predetermined scale of relative network quality further based at least in part on the second peak signal level.

5. The system according to claim 3, wherein the plurality of tests include a fifth test that includes:

the slave tool transmitting responses to queries for devices on the serial communication network, in which the responses are transmitted at incrementally lower transmission signal levels until message loss is detected; and determining a second lower signal level at which responses from the slave are received by the master tool without message loss on the serial communication network;

wherein determining the at least one classification of the relative quality of the serial communication network is carried out with respect to the at least one predetermined scale of relative network quality further based at least in part on the second lower signal level.

6. The system according to claim 1, wherein the plurality of tests include a sixth test that includes:

listening to the network when inactive and not transmitting building automation communications in order to determine a residual noise level on the serial communication network;

wherein determining the at least one classification of the relative quality of the serial communication network is carried out with respect to the at least one predetermined scale of relative network quality further based at least in part on the residual noise level.

7. The system according to claim 1, wherein the at least one field device include a heating, ventilation, and air conditioning (HVAC) field device, wherein the building automation communications include BACnet and Modbus, wherein the serial communication network includes an RS-485 network.

8. A method for qualitative analysis of baseband building automation networks comprising:

through operation of at least one processor:
carrying out a plurality of tests on a serial communication network that includes at least one field device that carries out building automation communications on the serial communication network, wherein the plurality of tests include a first test that includes:

transmitting a series of queries for devices on the serial communication network, in which the queries are transmitted at incrementally lower transmission signal levels until message loss is detected by the at least one field device failing to respond to the queries; and determining a first lower signal level at which transmissions of queries occur without message loss on the serial communication network;

determining at least one classification of a relative quality of the serial communication network with respect to at least one predetermined scale of relative network quality based at least in part on the first lower signal level; and outputting on a display device the at least one classification.

9. The method according to claim 8, wherein the plurality of tests include a second test that includes:

receiving at least one response from a field device on the serial communication network responding to at least one query that was transmitted on the serial communication network; and determining a first peak signal level of the at least one response;

wherein determining the at least one classification of the relative quality of the serial communication network is carried out with respect to the at least one predetermined scale of relative network quality further based at least in part on the first peak signal level.

10. The method according to claim 8, wherein the network tool includes a master tool and a slave tool, wherein the plurality of tests include a third test that includes:

determining a baud rate upper limit based on analyzing communications received by the master tool from the slave tool by carrying out:

a first approach in which:

the master tool transmits a series of queries for devices on the serial communication network, in which the queries are transmitted at different baud rates;

the slave tool transmits at least one response to each query from the master tool on the serial communication network, which responses include predetermined information;

the master tool receives the at least one response to each query from the slave tool on the serial communication network; and the master tool validates whether the predetermined information in the at least one response to each query matches expected predetermined information in order to determine the baud rate upper limit corresponding to a maximum baud rate that returns matching predetermined information;

a second approach in which:

the master tool transmits a series of commands to the slave device on the serial communication network, in which the commands specify respective different frequencies for transmitting respective pulse trains;

the slave tool transmits pulse trains on the serial communication network in response to each command at the specified frequency; and the master tool analyzes each pulse train to determine the baud rate upper limit corresponding to a maximum pulse train frequency at which the pulse trains reliably communicate information;

or a combination thereof;

wherein determining the at least one classification of the relative quality of the serial communication network is carried out with respect to the at least one predetermined scale of relative network quality further based at least in part on the baud rate upper limit.

11. The method according to claim 10, wherein the plurality of tests include a fourth test that includes:

receiving with the slave tool, at least one transmission on the serial communication network from at least one of the master tool, at least one field device, or any combination thereof; and determining a second peak signal level of the at least one transmission;

wherein determining the at least one classification of the relative quality of the serial communication network is carried out with respect to the at least one predetermined scale of relative network quality further based at least in part on the second peak signal level.

12. The method according to claim 10, wherein the plurality of tests include a fifth test that includes:

the slave tool transmitting responses to queries for devices on the serial communication network, in which the responses are transmitted at incrementally lower transmission signal levels until message loss is detected; and determining a second lower signal level at which responses from the slave are received by the master tool without message loss on the serial communication network;

wherein determining the at least one classification of the relative quality of the serial communication network is carried out with respect to the at least one predetermined scale of relative network quality further based at least in part on the second lower signal level.

13. The method according to claim 8, wherein the plurality of tests include a sixth test that includes:

listening to the network when inactive and not transmitting building automation communications in order to determine a residual noise level on the serial communication network;

wherein determining the at least one classification of the relative quality of the serial communication network is carried out with respect to the at least one predetermined scale of relative network quality further based at least in part on the residual noise level.

14. The method according to claim 8, wherein the at least one field device include a heating, ventilation, and air conditioning (HVAC) field device, wherein the building automation communications include BACnet and Modbus, wherein the serial communication network includes an RS-485 network.

15. A non-transitory computer readable medium encoded with processor executable instructions that when executed by at least one processor, cause the at least one processor to carry out a method for qualitative analysis of baseband building automation networks comprising:

carrying out a plurality of tests on a serial communication network that includes at least one field device that carries out building automation communications on the serial communication network, wherein the plurality of tests include a first test that includes:

transmitting a series of queries for devices on the serial communication network, in which the queries are transmitted at incrementally lower transmission signal levels until message loss is detected by the at least one field device failing to respond to the queries; and determining a first lower signal level at which transmissions of queries occur without message loss on the serial communication network;

determining at least one classification of a relative quality of the serial communication network with respect to at least one predetermined scale of relative network quality based at least in part on the first lower signal level; and outputting on a display device the at least one classification.

* * * * *